(12) United States Patent
Sun

(10) Patent No.: US 10,313,188 B2
(45) Date of Patent: Jun. 4, 2019

(54) METHOD FOR REMOTE MANAGEMENT OF MULTIPLE DEVICE CONFIGURATIONS

(71) Applicant: Kyocera Document Solutions Inc., Osaka (JP)

(72) Inventor: Changsong Sun, Fort Lee, NJ (US)

(73) Assignee: Kyocera Document Solutions Inc., Osaka (JP)

( * ) Notice: Subject to any disclaimer, the term of this patent is extended or adjusted under 35 U.S.C. 154(b) by 141 days.

(21) Appl. No.: 15/371,965

(22) Filed: Dec. 7, 2016

(65) Prior Publication Data

US 2018/0159737 A1    Jun. 7, 2018

(51) Int. Cl.
*H04L 12/24* (2006.01)
*G06F 9/4401* (2018.01)
*G06F 9/445* (2018.01)

(52) U.S. Cl.
CPC ........ *H04L 41/0846* (2013.01); *G06F 9/4411* (2013.01); *G06F 9/44505* (2013.01); *H04L 41/22* (2013.01)

(58) Field of Classification Search
CPC .................................................. H04L 41/0846
See application file for complete search history.

(56) References Cited

U.S. PATENT DOCUMENTS

| | | | |
|---|---|---|---|
| 6,563,519 B1 | 5/2003 | Minagawa | |
| 2006/0259549 A1* | 11/2006 | Huang | G06K 15/00 709/203 |
| 2010/0115254 A1 | 5/2010 | Deng et al. | |
| 2012/0268782 A1* | 10/2012 | Hamaguchi | G06F 3/1204 358/1.15 |
| 2016/0378412 A1* | 12/2016 | Hayashi | G06F 3/1253 358/1.15 |

* cited by examiner

Primary Examiner — Suraj M Joshi
(74) Attorney, Agent, or Firm — HEA Law PLLC

(57) ABSTRACT

A method for remote maintenance of devices includes: configuring one device among a plurality of devices; exporting a configuration file including the configuration of the one device configured by the configuring; editing the exported configuration file; and importing the edited configuration file into a plurality of target applications in at least a part of the plurality of devices other than the one device.

18 Claims, 5 Drawing Sheets

METHOD FOR REMOTE MANAGEMENT OF MULTIPLE DEVICE CONFIGURATIONS

BACKGROUND

Unless otherwise indicated herein, the description in this section is not prior art to the claims in this application and is not admitted to be prior art by inclusion in this section.

Recently, an image forming device (for example, a printer, a multifunction printer, or a multi-functional peripheral) has become to use a software platform that expands its core capabilities on which applications run for addressing user's unique workflow needs. In association with this, it has been spreading that an operation by vendors and service providers of image forming devices maintain a multiple image forming devices from remote places. Remote management allows service persons or similar operators to consistently make a diagnosis, troubleshoot, update firmware, setting, and even supply toners and other spare parts, as part of maintenance related to an image forming device. In this remote management, the service persons desire to reduce setup time for configuration changes for multiple image forming devices.

In such conditions, it is expected that an improvement in work efficiency by maintenance administrators performing the remote management.

SUMMARY

A method for remote maintenance of devices according to one aspect of the disclosure includes: configuring one device among a plurality of devices; exporting a configuration file including the configuration of the one device configured by the configuring; editing the exported configuration file; and importing the edited configuration file into a plurality of target applications in at least a part of the plurality of devices other than the one device.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
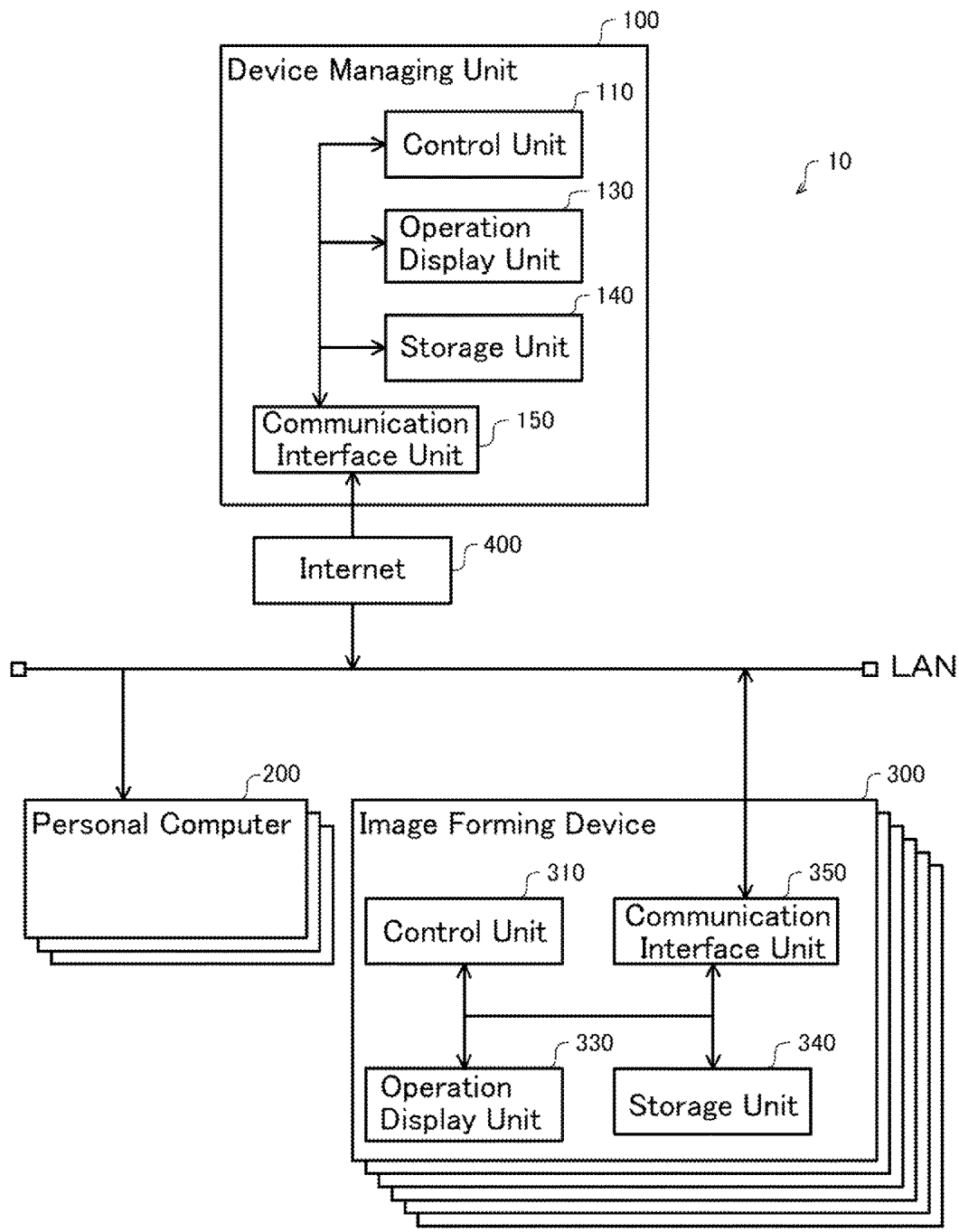
FIG. 1 is a block diagram illustrating a functional configuration of a remote management system 10 according to one embodiment of the disclosure.

Example devices are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes one embodiment of the disclosure (hereinafter referred to as, the "embodiments") with reference to the drawings.

FIG. 1 is a block diagram illustrating a functional configuration of a remote management system 10 according to one embodiment of the disclosure. The remote management system 10 includes a device managing unit 100, a plurality of personal computers 200, and a plurality of image forming devices 300. The plurality of image forming devices 300 are shared by users of the plurality of personal computers 200. The plurality of image forming devices 300 are connected to the plurality of personal computers 200 via the network (LAN in this example).

The communication interface unit 150 and the communication interface unit 350 communicate using transmission control protocol/internet protocol (TCP/IP) protocols.

The device managing unit 100 is a personal computer provided for remote management of devices including the plurality of image forming devices 300. The device managing unit 100 is installed outside an office where the plurality of personal computers 200 and the plurality of image forming devices 300 are placed. The device managing unit 100 is connected to the network via internet 400 for remote management.

The device managing unit 100 may be connected to the network via the Internet 400 using a protocol with high secrecy such as hypertext transfer protocol secure (HTTPS). However, the communication between the device managing unit 100 and the image forming devices 300 are not secure as certificates are not installed on the image forming devices 300. The remote management is performed by a service person outside the office in this embodiment.

The device managing unit 100 may be directly connected to the network for an IT administrator in charge of management of the plurality of image forming devices 300. This management may be performed by the IT administrator inside the office.

The device managing unit 100 includes a control unit 110, an operation display unit 130, a storage unit 140, and a communication interface unit 150. The image forming device 300 includes a control unit 310, an operation display unit 330, a storage unit 340, and a communication interface unit 350.

The operation display unit 130 of the device managing unit 100 and the operation display unit 330 of the image forming device 300 each function as a touch panel in this embodiment to display various menus as entry screens. The operation display unit 130 further provides user interfaces such as a computer mouse and a keyboard in this embodiment to receive operation inputs by the service person.

The control units 110, 310 include a main storage unit such as a RAM and a ROM, and a control unit such as a micro-processing unit (MPU) and a central processing unit (CPU). The control units 110, 310 also include a controller function related to interfaces such as various kinds of I/O, a universal serial bus (USB), a bus and other hardware, and respectively control the whole device managing unit 100 and the whole image forming device 300.

The storage units 140, 340 are storage devices constituted of such as a hard disk drive and a flash memory, which are non-temporal recording media, and respectively store control programs and data of processes executed by the control units 110, 310.

Figure 2:
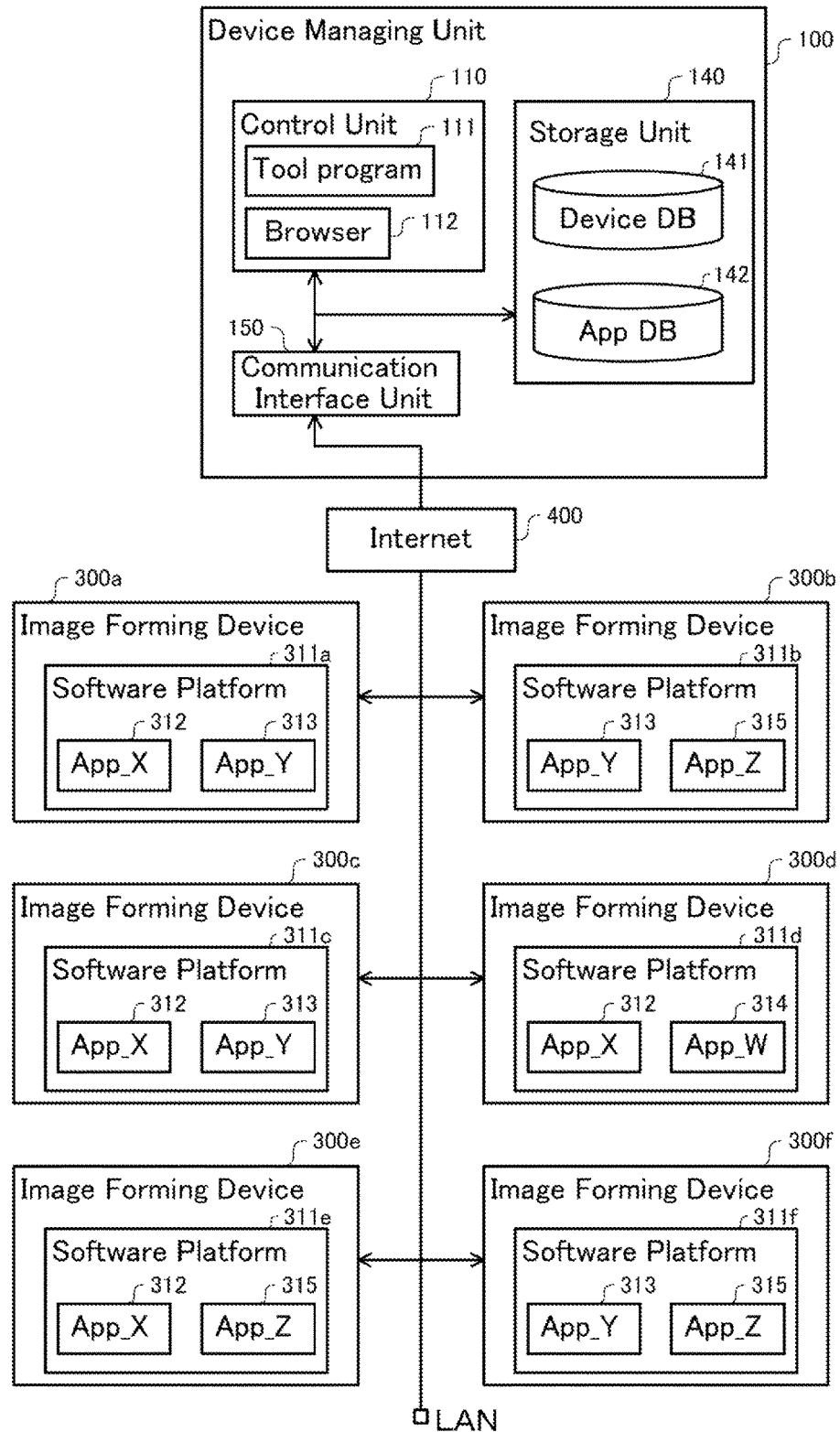
FIG. 2 is a block diagram illustrating the device managing unit 100 connected to the plurality of image forming devices 300 according to the one embodiment.

FIG. 2 is a block diagram illustrating the device managing unit 100 connected to the plurality of image forming devices 300 according to the one embodiment. The control unit 110 of the device managing unit 100 includes a tool program 111 and a browser 112. The tool program 111 provides remote maintenance services for the plurality of image forming devices 300. The browser 112 is a web browser to achieve a web-based display to provide a configuration page or simulate a user interface for each of the plurality of image forming devices 300.

The storage unit 140 of the device managing unit 100 includes a device database 141 and an application database 142. The device database 141 stores device information that represents setting contents and states of the plurality of image forming devices 300. The application database 142 will be described later. The plurality of image forming devices 300 include image forming devices 300*a* to 300*f*.

The image forming device 300*a* includes a software platform 311*a* that expands image forming device's core capabilities on which applications run for addressing user's unique workflow needs. The software platform may employ, for example, Hybrid Platform for Advanced Solutions (Hy-PAS™).

The control units 310 of the image forming devices 300*a* to 300*f* respectively include software platforms 311*a* to 311*f*. The software platform 311*a* includes an application X 312, which is also referred to as App_X, and an application Y 313, which is also referred to as App_Y. The software platform 311*b* includes the application Y 313 and an application Z 315, which is also referred to as App_Z. The software platform 311*c* includes the application X 312 and the application Y 313. The software platform 311*d* includes the application X 312 and an application W 314, which is also referred to as App_W. The software platform 311*e* includes the application X 312 and the application Z 315. The software platform 311*f* includes the application Y 313 and the application Z 315.

Figure 3:
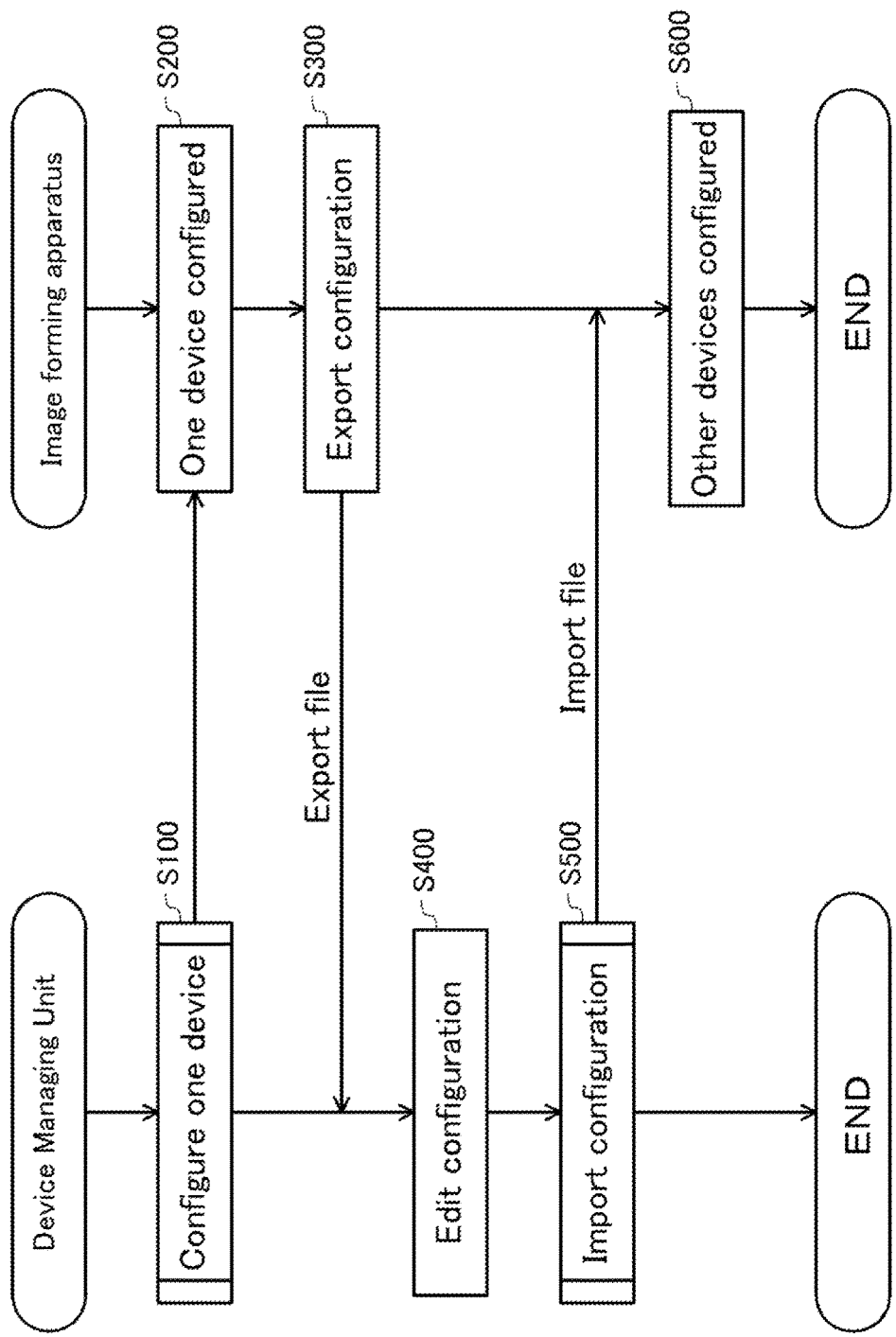
FIG. 3 is a flowchart illustrating a remote configuration change method for the plurality of image forming devices 300 according to the one embodiment.

FIG. 3 is a flowchart illustrating a remote configuration change method for the plurality of image forming devices 300 according to the one embodiment. In this example, the device managing unit 100 collectively changes configurations of the plurality of applications X of the image forming devices 300*a*, 300*c*, 300*d*, and 300*e*.

At step S100, the service person launches the tool program 111 on the device managing unit 100 and opens a configuration page (not shown) on the browser 112. The service person specifies the applications X as target application to configure on the configuration page. The device managing unit 100 shows a list of the plurality of image forming devices 300 with the application X on the browser 112. This list is prepared by the tool program 111 using the application database 142.

The application database 142 stores indexes for URLs of all the applications in the respective software platforms 311*a* to 311*f*. Alternatively, the software platforms 311*a* to 311*f* may have a common rule to define configuration URLs for all the applications, thus ensuring access to all the applications by the device managing unit 100 using the URLs defined according to the common rule. This eliminates the need for the application database 142.

Figure 4:
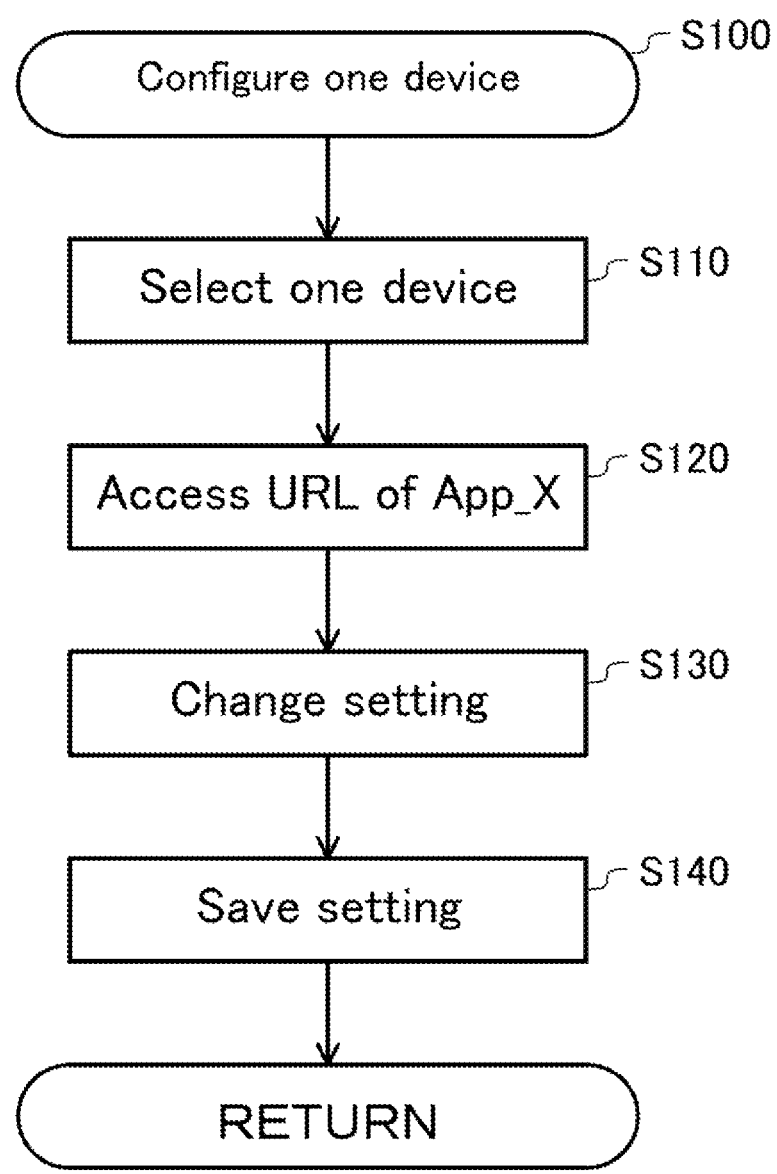
FIG. 4 is a flowchart illustrating a one-device configuring step (step S100) according to the one embodiment.

FIG. 4 is a flowchart illustrating a one-device configuring step (step S100) according to the one embodiment. At step S110, the service person selects one of the plurality of image forming devices 300 from the list as a base device. If the application X 312 is activated in the image forming device 300, the application X 312 works on the image forming device 300 without being affected by the remote management. If the application X 312 is not activated in the image forming device 300, the application X 312 runs in a remote management mode in which the application X runs in background for setting on the image forming device 300. In this case, the service person selects the image forming device 300*a* from the list.

At step S120, the device managing unit 100 accesses the URL of the application X 312. The URL of the application X 312 is defined by the common rule or retrieved from the application database 142. The application X 312 provides data for an interface screen for setting to the device managing unit 100 while the application X is ordinarily working for the image forming device 300*a*. The provided data includes configuration items of the application X 312.

At step S130, the browser 112 of the device managing unit 100 simulates an interface screen (not shown) of the application X 312 on the operation display unit 330 in the image forming device 300*a*. Alternatively, the browser 112 of the device managing unit 100 may provide an interface screen (not shown) for setting the application X 312 that is different from the interface screen (not shown) of the application X 312 on the operation display unit 330.

The browser 112 shows current configuration of the application X 312 to allow the service person to remotely control the application X through the simulated interface screen (not shown) on the operation display unit 130 in the device managing unit 100. The service person configures the configuration items of the application X 312, or changes the setting of the application X 312, via the device managing unit 100.

At step S140, the service person saves thus configured configuration items in the storage unit 340 in the image forming device 300*a* via the device managing unit 100. Specifically, the device managing unit 100 requests the image forming device 300*a* to receive and save the changed setting, and then sends the changed setting. The image forming device 300*a* receives and saves the changed setting, and then returns an acknowledgement of the changed setting. The browser 112 of the device managing unit 100 shows the saved configuration items of the application X 312 using the received configuration file.

At step S200, the application X 312 is thus remotely configured by the device managing unit 100. At step S300, the application X 312 prepares a configuration file as an export file by securing and compressing the export file by password because the export file might include confidential information, in response to request from the device managing unit 100. Then, the application X 312 exports the secured export file to the device managing unit 100. The device managing unit 100 receives and decompresses the export file.

At step S400, the service person edits the decompressed export file as necessary on the device managing unit 100 to prepare an import file. Alternatively, the service person employs the export file as the import file without any change.

Figure 5:
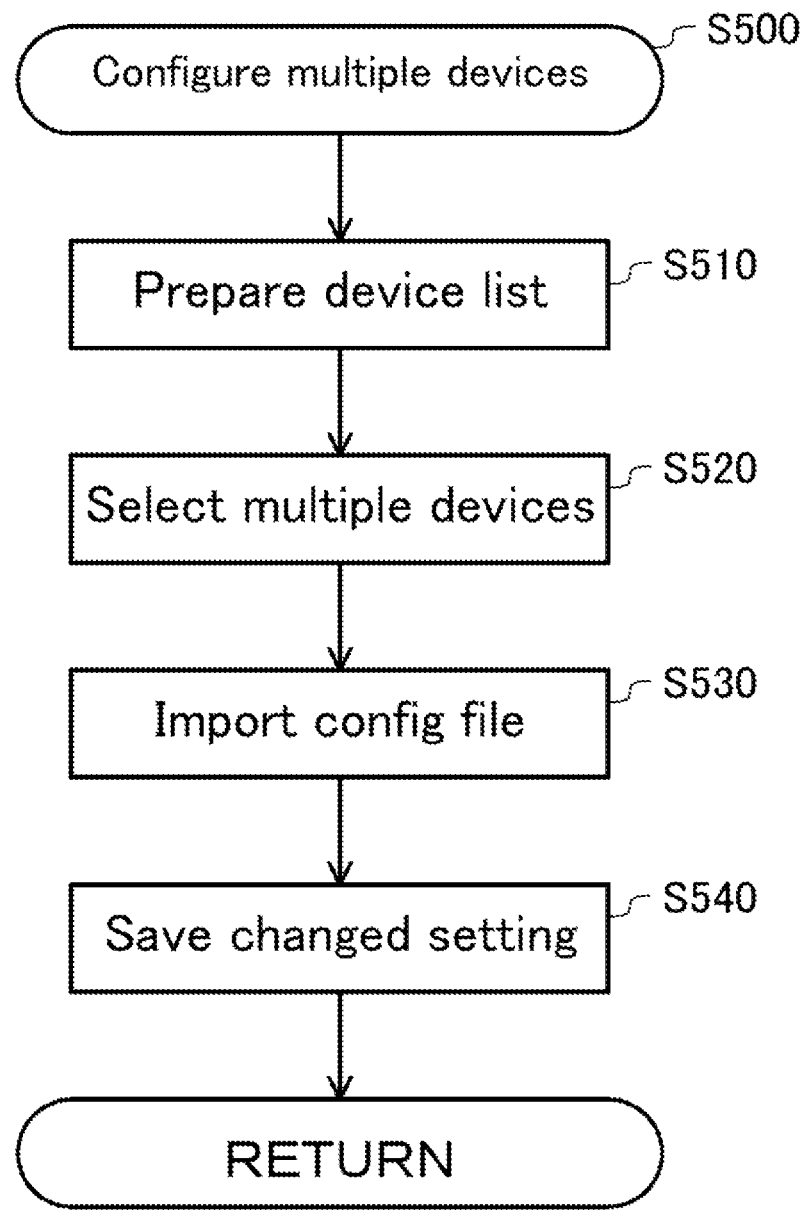
FIG. 5 is a flowchart illustrating a multiple-device configuring step (step S500) according to the one embodiment.

FIG. 5 is a flowchart illustrating a multiple-device configuring step (step S500) according to the one embodiment. In this example, the device managing unit 100 collectively changes configurations of applications X of the image forming devices 300a, 300c, 300d, and 300e.

At step S510, the device managing unit 100 prepares a device list that includes the image forming devices 300 having the application X. The list shows the image forming devices 300a, 300c, 300d, and 300e on the browser 112.

At step S520, the service person selects multiple, which is all in this case, the image forming devices 300 having the application X as target at once, namely, the image forming devices 300a, 300c, 300d, and 300e on the browser 112.

At step S530, the service person imports the edited/non-edited import file, which is an edited/non-edited configuration file, to all the image forming devices 300a, 300c, 300d, and 300e. Specifically, the device managing unit 100 collectively requests all the image forming devices 300a, 300c, 300d, and 300e to save and set the import file. At step S540, the image forming devices 300a, 300c, 300d, and 300e receives, decompresses and analyzes the import file, and then store the decompressed import file in the respective storage units 340. The applications X run without changing their setting until the image forming devices 300 puts the control unit 310 into sleep mode.

At step S600, the applications X automatically install the import file itself when waking up from the sleep mode. Thus, the applications X can change its configuration without disturbing the operation.

Thus, the remote management system 10 according to the one embodiment allows the service persons and the IT administrators to collectively configure the plurality of image forming apparatuses 300. This ensures the saved time and the reduced work load of the service persons and the IT administrators for configuration changes for plurality of applications running on the image forming apparatuses 300.

MODIFICATIONS

The disclosure will not be limited to the one embodiment described above, but modifications as follows are also possible.

Modification 1

While the above-described embodiment uses the image forming devices in the user office as the base device, the vendor side may have an image forming device as the base device to prepare the import file. In this case, the sales person can fully simulate the image forming device for preparing the import file.

Modification 2

While the above-described embodiment uses the base device to configure and prepare the import file, the vendor side may prepare the import file without configuring process of the base device. Namely, the sales person can cause one of the image forming devices to export a configuration file and import the configuration file to the other image forming devices to make clones.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for remote maintenance of a plurality of network-linked electromechanical devices each having a control unit containing a software platform including configurable device-operating applications, the remote device-maintenance method comprising:
changing a configurational setting in a base application among the device-operating applications in, as a base device, one of the plurality of network-linked electromechanical devices;
via the base application preparing, and exporting into storage in the base device, a configuration file including the changed configurational setting for the base application in the base device;
editing the exported configuration file to prepare the configuration file to be importable to, as one or more target devices, the other of the plurality of network-linked electromechanical devices; and
importing the edited configuration file into a target application corresponding to the base application in each of the one or more target devices.

2. The remote device-maintenance method according to claim 1, wherein the changing a configurational setting includes:
via the network providing a user interface for selecting the base device;
via the user interface accessing a defined configuration URL for the base application to open a configuration page for configuring the base application;
via the user interface opening the configuration page using data from the defined configuration URL;
via the user interface changing a configurational setting in the base application via the configuration page, and via the network sending the changed configurational setting to the base device; and
in the base device, receiving the changed setting, saving the changed setting, and returning to the user interface an acknowledgement of the changed setting.

3. The remote device-maintenance method according to claim 2, wherein the exporting includes:
sending an export request to the base application in the base device via the user interface and the defined configuration URL for the base application;
in the base device, receiving the request via the defined configuration URL; and
via the base device, returning the prepared configuration file to the user interface.

4. The remote device-maintenance method according to claim 2, wherein the importing includes:
sending the edited configuration file to the respective target applications in the one or more target devices, via the user interface and the defined configuration URL;
receiving and analyzing the edited configuration file in the respective target applications in the one or more target devices; and
setting the edited configuration file in the respective target applications in the one or more target devices.

5. The remote device-maintenance method according to claim 1, wherein the method collectively configures the respective target applications in one or more image forming devices as the one or more target devices.

6. The remote device-maintenance method according to claim 1, wherein:
the control units are enabled for putting the electromechanical devices into, and waking the electromechanical devices from, sleep mode; and
the base application in the base device and the target application in the target devices operate under unchanged configurational settings until the control units put the electromechanical devices into sleep mode, and upon the control units waking the electromechanical devices from sleep mode, the base application in the base device and the target application in the target devices install the configuration file, thereby changing the configuration of the base application and corresponding target applications themselves.

7. A computer for remote maintenance of a plurality of network-linked electromechanical devices each having a control unit containing a software platform including configurable device-operating applications, the remote device-maintenance computer comprising:
at least one processor;
memory; and
program instructions, stored in the memory, that upon execution by the at least one processor cause the computer to perform operations including
changing a configurational setting in a base application among the device-operating applications in, as a base device, one of the plurality of network-linked electromechanical devices;
causing the base device to via the base application prepare, and export into storage in the base device, a configuration file including the changed configurational setting for the base application in the base device;
editing the exported configuration file to prepare the configuration file to be importable to, as one or more target devices, the other of the plurality of network-linked electromechanical devices; and
causing a target application corresponding to the base application in each of the one or more target devices to import the edited configuration file.

8. The remote device-maintenance computer according to claim 7, wherein the changing a configurational setting includes:
via the network providing a user interface for selecting the base device;
via the user interface accessing a defined configuration URL for the base application to open a configuration page for configuring the base application;
via the user interface opening the configuration page using data from the defined configuration URL;
via the user interface changing a configurational setting in the base application via the configuration page, and via the network sending the changed configurational setting to the base device; and
in the base device, receiving the changed setting, saving the changed setting, and returning to the user interface an acknowledgement of the changed setting.

9. The remote device-maintenance computer according to claim 8, wherein the exporting includes:
sending an export request to the base application in the base device via the user interface and the defined configuration URL for the base application;
in the base device, receiving the request via the defined configuration URL;
and
via the base device, returning the prepared configuration file to the user interface.

10. The remote device-maintenance computer according to claim 8, wherein the importing includes:
sending the edited configuration file to the respective target applications in the one or more target devices, via the user interface and the defined configuration URL;
receiving and analyzing the edited configuration file in the respective target applications in the one or more target devices; and
setting the edited configuration file in the respective target applications in the one or more target devices.

11. The remote device-maintenance computer according to claim 7, wherein the computer collectively configures the respective target applications in one or more image forming devices as the one or more target devices.

12. The remote device-maintenance computer according to claim 7, wherein:
the control units are enabled for putting the electromechanical devices into, and waking the electromechanical devices from, sleep mode; and
the base application in the base device and the target application in the target devices operate under unchanged configurational settings until the control units put the electromechanical devices into sleep mode, and upon the control units waking the electromechanical devices from sleep mode, the base application in the base device and the target application in the target devices install the configuration file, thereby changing the configuration of the base application and corresponding target applications themselves.

13. A non-transitory computer readable medium for remote maintenance of electromechanical devices, the computer readable medium having stored thereon program instructions that upon execution by a processor cause the processor to perform a set of acts for remote maintenance of a plurality of network-linked electromechanical devices each having a control unit containing a software platform including configurable device-operating applications, the set of acts comprising:
changing a configurational setting in a base application among the device-operating applications in, as a base device, one of the plurality of network-linked electromechanical devices;
causing the base device to via the base application prepare, and export into storage in the base device, a configuration file including the changed configurational setting for the base application in the base device;
editing the exported configuration file to prepare the configuration file to be importable to, as one or more target devices, the other of the plurality of network-linked electromechanical devices; and
causing a target application corresponding to the base application in each of the one or more target devices to import the edited configuration file.

14. The computer readable medium according to claim 13, wherein the changing a configurational setting includes:
via the network providing a user interface for selecting the base device;
via the user interface accessing a defined configuration URL for the base application to open a configuration page for configuring the base application;
via the user interface opening the configuration page using data from the defined configuration URL;
via the user interface changing a configurational setting in the base application via the configuration page, and via the network sending the changed configurational setting to the base device; and
in the base device, receiving the changed setting, saving the changed setting, and returning to the user interface an acknowledgement of the changed setting.

15. The computer readable medium according to claim 14, wherein the exporting includes:

sending an export request to the base application in the base device via the user interface and the defined configuration URL for the base application;

in the base device, receiving the request via the defined configuration URL; and via the base device, returning the prepared configuration file to the user interface.

16. The computer readable medium according to claim 14, wherein the importing includes:

sending the edited configuration file to the respective target applications in the one or more target devices, via the user interface and the defined configuration URL;

receiving and analyzing the edited configuration file in the respective target applications in the one or more target devices; and setting the edited configuration file in the respective target applications in the one or more target devices.

17. The computer readable medium according to claim 13, wherein the set of acts comprises collectively configuring the respective target applications in one or more image forming devices as the one or more target devices.

18. The computer readable medium according to claim 13, wherein:

the control units are enabled for putting the electromechanical devices into, and waking the electromechanical devices from, sleep mode; and the base application in the base device and the target application in the target devices operate under unchanged configurational settings until the control units put the electromechanical devices into sleep mode, and upon the control units waking the electromechanical devices from sleep mode, the base application in the base device and the target application in the target devices install the configuration file, thereby changing the configuration of the base application and corresponding target applications themselves.

* * * * *